United States Patent [19]

Bahal

[11] 3,867,523

[45] Feb. 18, 1975

[54] STABILIZATION OF AMPICILLIN WITH SUCROSE

[75] Inventor: Surendra M. Bahal, Upper Darby, Pa.

[73] Assignee: American Home Products Corporation, New York, N.Y.

[22] Filed: June 8, 1970

[21] Appl. No.: 44,548

[52] U.S. Cl. .................................. 424/176, 424/271

[51] Int. Cl. .............................................. A61k 21/00

[58] Field of Search .............................. 424/271, 176

[56] References Cited

UNITED STATES PATENTS 3,317,389 5/1967 Granatek et al. .................. 424/271

3,351,527 11/1967 Apat et al. .......................... 424/271

*Primary Examiner*—Vincent D. Turner

*Attorney, Agent, or Firm*—Joseph Martin Weigman

[57] ABSTRACT

The formation of hydrates of anhydrous ampicillin may be avoided by (1) the addition of about 70% *w/v* of sucrose and (2) adjustment of the product pH to about 3 to 6.5. The invention is useful in extending the shelf life of aqueous dosage forms of anhydrous ampicillin.

2 Claims, No Drawings

STABILIZATION OF AMPICILLIN WITH SUCROSE

This invention relates to methods of stabilization of aqueous suspensions of anhydrous, hydrate-forming ampicillin and to the resulting compositions. The stabilized compositions may be stored under all required temperature conditions, and particularly at about 2° to 30°C., without substantial changes in the physical properties of the suspension due to the formation of hydrates. More particularly the invention is directed to aqueous suspensions of anhydrous ampicillin stabilized at about 5° to 25°C. by the addition of sucrose and buffering to about pH 3 to 6.5.

It is known that certain drugs such as ampicillin, exist both as the anhydrous and hydrated forms. When aqueous suspension formulations of the anhydrous ampicillin are stored, especially at refrigerated temperatures, it has a tendency to show crystal growth, either macroscopically or microscopically or both, and other associated physical changes in the product. These changes have been shown to be due to the formation of the thermodynamically more stable crystal forms, the hydrated forms. It has been shown that the hydrated forms of ampicillin are thermodynamically the more stable crystal forms at the normal storage temperature for pharmaceutical suspensions. This means that anhydrous ampicillin aqueous suspensions formulated according to the present practice in the art will tend to convert to the more stable hydrate forms below the transition temperature of ampicillin. The transition temperature is the temperature at which all forms are thermodynamically stable. The transition temperature is 42°C. for ampicillin [Poole and Bahal, *J. Pharm. Sci.*, 67, 1945 (1968) ]. Because the transition temperature is well above that of normal storage conditions for the products, the conversion to the hydrated forms will occur when the suspensions are stored at either room temperature, about 20°–25°C., or under refrigerated conditions, about 2°–15°C. However, the conversion occurs more rapidly at 2°–15°C., the most typical storage condition for ampicillin as a result of its relatively poor chemical stability at higher temperature.

Changes in the crystal forms of anhydrous ampicillin are undesirable because this will affect its solubility and resultant biological absorption, as measured by blood levels plus the physical properties of the pharmaceutical suspensions. The anhydrous form of ampicillin is the more desirable form because it gives higher blood levels than the hydrated forms. The shelf life of an anhydrous ampicillin suspension is about two to three weeks following reconstitution from the dry powder form in which it is marketed. It is during this period of shelf life that maintenance of the anhydrous form is essential. See, for instance, "Physicochemical Factors Influencing the Absorption of the Anhydrous and Trihydrate forms of Ampicillin," Poole, et al., *Current Therapeutic Research*, 10, 292 (1968). The dry powders for reconstitution commonly contain numerous pharmaceutical additives such as colors, flavors, buffers, sweeteners, etc., but according to the present practice in the art the level and type of additives do not prevent the conversion of anhydrous ampicillin to its hydrated forms.

It is an object of the present invention to provide methods for the stabilization of anhydrous ampicillin in aqueous suspensions.

It is a further object of the present invention to provide methods for retarding the conversion of anhydrous ampicillin to its hydrated forms.

It is a particular object of the present invention to provide methods for the improvement of shelf life of aqueous suspensions of anhydrous ampicillin.

It is still another object of the present invention to provide aqueous compositions of anhydrous ampicillin which are stabilized against hydrate formation.

It is a further object of the present invention to prevent the crystal growth and conversion to hydrates in aqueous suspension formulations of anhydrous ampicillin.

It is a particular object of the present invention to provide stabilized dosage forms of aqueous suspensions of anhydrous ampicillin which will yield its inherent blood level and have improved physical stability throughout their shelf life.

It has been found that the conversion of hydrate-forming anhydrous penicillin to the less desirable hydrated forms when in aqueous suspensions may be prevented (1) by the use of suitable concentrations of soluble solutes such as sucrose, dextrose, galactose, and sodium chloride and (2) by the adjustment of an aqueous suspension product pH to about 3.0 to 6.5, preferably 4.0–6.5. Preferred concentrations for the solutes are: 25–86 percent *w/v* sucrose, 5–50 percent *w/v* dextrose (glucose), 5–>70 percent *w/v* galactose, and 1–30 percent *w/v* sodium chloride.

The mechanism by which levels of suitable soluble solutes prevent anhydrous ampicillin hydration is not completely understood, and without wishing to be bound by a theory of operation, the initial postulation is that the solutes lower the solubility of anhydrous ampicillin, and that the lower solubility stabilizes the suspension by virtue of the fact that the solubility of the anhydrous species approaches the lower solubility of the hydrated forms to a sufficient extent to increase the free energy required for conversion to the hydrates.

It has been found, however, that the concentrations of the solutes required to achieve the objects of the invention will vary depending on the particular solute used. It has been further found that dissolution of a solute in the concentrations and the types usually used in pharmaceutical products will not produce the desired result.

As previously discussed, the tendency of ampicillin to convert to the hydrated species is greater at lower temperatures, such as about 2°–15°C., than at higher temperature such as 20°–35°C. For this reason it has been found that the concentration of soluble solute required to prevent hydrate formation at lower temperatures is normally greater than the concentration required at higher temperatures.

The following concentration ranges of solutes have been found effective at the temperatures indicated at a pH of between 5 and 6.5. The concentration ranges are given in terms of percent weight per volume of solute (percent *w/v*) where > means "greater than" and < means "less than:"

| | 5°C | | 25°C | |
|---|---|---|---|---|
| | minimum | preferred | minimum | preferred |
| sucrose | 70 | >80 | 30* 50** | >60 |
| dextrose | 50* 10** | >50 | 15* 5** | 20 |
| galactose | >70* 10** | >70 | 15* 5** | 20 |
| sodium chloride | 20 | >25 | <5 | <5 |

*at pH 5.0
**at pH 6.5.

The minimum amounts are effective with ampicillin batches which show least tendency for conversion under the conditions described above.

In order to disclose more clearly the nature of the present invention, specific examples of the practice of the invention are hereinafter given. It should be understood, however, that this is done solely by way of example and is intended neither to delineate the scope of the invention nor limit the ambit of the appended claims.

EXAMPLE 1

This example illustrates the use of a high level of solute to prevent the conversion of anhydrous ampicillin to the hydrated form in aqueous formulations.

A dry powder is prepared from each of the following recipes:

| Ingredient | Control | A. | B. | C. |
|---|---|---|---|---|
| Anhydrous Ampicillin | 2.00 Gm. | 2.00 Gm. | 2.00 Gm. | 2.00 Gm. |
| Sodium Benzoate | 0.40 Gm. | 0.40 Gm. | 0.40 Gm. | 0.40 Gm. |
| Sodium Citrate | 0.16 Gm. | 0.16 Gm. | 0.16 Gm. | 0.16 Gm. |
| Propylparaben | 0.01 Gm. | 0.01 Gm. | 0.01 Gm. | 0.01 Gm. |
| Methylparaben | 0.09 Gm. | 0.09 Gm. | 0.09 Gm. | 0.09 Gm. |
| Sucrose | — | 24.00 Gm. | 40.00 Gm. | 64.00 Gm. |
| Sucrose Concentration | (0% w/v) | (30% w/v) | (50% w/v) | (80% w/v) |

More sodium citrate or citric acid was added to adjust the pH to desired value.

The ingredients are mixed with water to make 80 milliliters (ml.) of the final suspension.

One group of samples is stored at room temperature (25° ± 2°C.) and a second group of samples is stored under refrigerated conditions at a temperature of 5° ± 2°C. The samples were viewed microscopically initially and at different intervals for up to 2 weeks. Any hydrate formation was noted by the appearance of long needles under the microscope which is characteristic of hydrate formation with ampicillin. The Differential Thermal Analysis Method (DTA) was used as a test for the presence of hydrated ampicillin. Periodic DTA were carried out using the Dupont Model 900 DTA apparatus to confirm microscopic results. The limit of detection was 10 percent hydrates in these and other experiments. The results are shown below in Tables I-A and I-B.

TABLE I-A

Effect of Sucrose at pH 6.5

| Sample | Storage Temp. °C. | Initial Physical | Initial Microscopic | After 3 Days Physical | After 3 Days Microscopic | After 7 Days DTA | After 14 Days Physical | After 14 Days Microscopic | Physical | Microscopic |
|---|---|---|---|---|---|---|---|---|---|---|
| Control | 25 | H.S. | No needles | Growth | N.L.G. | — | N.L.G. | N.L.G. | N.L.G. | N.L.G. |
| A | 25 | H.S. | N.N. | N.C. | Large number of needles | > 20% | N.L.G. | N.L.G. | N.L.G. | N.L.G. |
| B | 25 | H.S. | N.N. | N.C. | N.C. | — | N.C. | N.C. | N.C. | N.C. |
| C | 25 | H.S. | N.N. | N.C. | N.C. | — | N.C. | N.C. | N.C. | N.C. |
| Control | 5 | H.S. | N.N. | Growth | N.L.G. | — | N.L.G. | N.L.G. | N.L.G. | N.L.G. |
| A | 5 | H.S. | N.N. | Growth | N.L.G. | — | N.L.G. | N.L.G. | N.L.G. | N.L.G. |
| B | 5 | H.S. | N.N. | Growth | N.L.G. | — | N.L.G. | N.L.G. | N.L.G. | N.L.G. |
| C | 5 | H.S. | N.N. | N.C. | N.C. | — | N.C. | N.C. | N.C. | Some needles (none at pH 6.2) |

H.S. - Homogeneous suspension
N.N. - No needles
N.L.G. - Needle like growth (almost complete conversion to needles)
N.C. - No change
N.T. Not tested
Growth - Macroscopic growth as needles

TABLE I-B

Effect of Sucrose at pH 5.0

| Sample | Storage Temp. °C. | Initial Physical | Initial Microscopic | After 3 Days Physical | After 3 Days Microscopic | After 7 Days Physical | After 7 Days Microscopic | After 14 Days Physical | After 14 Days Microscopic |
|---|---|---|---|---|---|---|---|---|---|
| Control | 25 | H.S. | N.N. | Growth | N.L.G. | N.T. | N.T. | N.T. | N.T. |
| A | 25 | H.S. | N.N. | N.C. | Some needles | N.C. | Some needles | N.C. | Some needles |
| B | 25 | H.S. | N.N. | N.C. | N.C. | N.C. | N.C. | N.C. | N.C. |
| C | 25 | H.S. | N.N. | N.C. | N.C. | N.C. | N.C. | N.C. | N.C. |

TABLE I-B

| Effect of Sucrose at pH 5.0 | | | | | | | | | |
|---|---|---|---|---|---|---|---|---|---|
| Sample | Storage Temp. °C. | Initial Physical | Initial Microscopic | After 3 Days Physical | After 3 Days Microscopic | After 7 Days Physical | After 7 Days Microscopic | After 14 Days Physical | After 14 Days Microscopic |
| Control | 5 | H.S. | N.N. | Growth | N.L.G. | N.T. | N.T. | N.T. | N.T. |
| A | 5 | H.S. | N.N. | Growth | N.L.G. | N.T. | N.T. | N.T. | N.T. |
| B | 5 | H.S. | N.N. | Growth | N.L.G. | N.T. | N.T. | N.T. | N.T. |
| C | 5 | H.S. | N.N. | N.C. | N.C. | N.C. | N.C. | N.C. | N.C. |

As illustrated in Tables I-A and I-B, the preparations do not show, physically or microscopically, any crystal growth or the presence of the hydrated antibiotic under either room temperature or refrigerated storage conditions over a 2 week period where high amounts of sucrose are used. In the control which used no sucrose and the sample containing 30–50 percent *w/v* of sucrose, crystal growth is observed both physically and microscopically under refrigerated storage. The Differential Thermal Analysis also shows excessive amounts of the hydrates with 30 percent sucrose sample stored at 25° at pH 6.5. No such changes occurred in the high sucrose (80 percent) formulations.

Based on the foregoing experiments, more than 50 percent *w/v* sucrose concentrations are required to inhibit or prevent the crystal changes. Sucrose concentrations of about 60 percent *w/v* may be used at lower pH values, that is values below pH 5, but sucrose concentration about 80 percent *w/v* is required to stabilize a product at about pH 6.

Accordingly, an operative limit of about 80 percent *w/v* sucrose, or greater, is the preferred range for stabilization of ampicillin at a product pH of about 6 for storage under either room temperature or refrigerated conditions.

EXAMPLE 2

The procedure for Example 1 was repeated substituting dextrose or galactose for sucrose using the required concentration of these sugars (that is 0, 10, 20, 35, and 40 percent *w/v*, as necessary). Results of visual and microscopic examination for up to two weeks were recorded following storage at room temperature or refrigerated temperature conditions. The results for dextrose were the same as those for galactose. These are given in the following Table II:

TABLE II

| Effect of Dextrose or Galactose | | | | | | | | | | |
|---|---|---|---|---|---|---|---|---|---|---|
| Sample | pH | Storage Temp. °C. | Initial Physical | Initial Microscopic | After 3 Days Physical | After 3 Days Microscopic | After 7 Days Physical | After 7 Days Microscopic | After 14 Days Physical | After 14 Days Microscopic |
| Control | 6.5 | 25 | H.S. | N.N. | Growth | N.L.G. | N.L.G. | N.L.G. | N.L.G. | N.L.G. |
| (10% w/v) | 6.5 | 25 or 5 | H.S. | N.N. | N.C. | N.C. | N.C. | N.C. | N.C. | N.C. |
| (40% w/v) | 6.5 | 25 or 5 | H.S. | N.N. | N.C. | N.C. | N.C. | N.C. | N.C. | N.C. |
| (10% w/v) | 5.0 | 25 | H.S. | N.N. | N.C. | N.C. | N.C. | N.C. | N.C. | Large number of needles |
| (20% w/v) | 5.0 | 25 | H.S. | N.N. | N.C. | N.C. | N.C. | N.C. | N.C. | N.C. |
| Control | 5.0 | 5 | H.S. | N.N. | Growth | N.L.G. | N.L.G. | N.L.G. | N.L.G. | N.L.G. |
| (20% w/v) | 5.0 | 5 | H.S. | N.N. | Growth | N.L.G. | N.L.G. | N.L.G. | N.L.G. | N.L.G. |
| (40% w/v) | 5.0 | 5 | H.S. | N.N. | Growth | N.L.G. | N.L.G. | N.L.G. | N.L.G. | N.L.G. |
| (25% w/v) | 6.0 | 25 or 5 | H.S. | N.N. | Growth | N.L.G. | N.L.G. | N.L.G. | N.L.G. | N.L.G. |
| (35% w/v) | 6.0 | 25 or 5 | H.S. | N.N. | N.C. | N.C. | N.C. | N.C. | N.C. | N.C. |

Results recorded in Table II show that greater amounts of dextrose or galactose are required to prevent crystal growth and hydration of ampicillin as the pH is decreased from 6.5 to 6.0 or 5.0. Thus, at pH 6.5, about 10 percent dextrose or galactose will prevent hydrate formation and physical changes at normal storage temperatures. At pH 5.0, 10–20 percent of these sugars will prevent growth at room temperature. However, at refrigerated temperatures, around 35 percent concentration is required at pH 6.0. At pH 5.0 at refrigerated temperatures, about 50 percent *w/v* dextrose prevents the hydration of ampicillin while up to 70 percent *w/v* galactose has no influence under these conditions.

EXAMPLE 3

The procedure of Example 1 was repeated substituting sodium chloride for the sucrose in the recipe as follows:

| Ingredient | Control | A | B | C | D |
|---|---|---|---|---|---|
| Anhydrous Ampicillin | 2.00 Gm. | 2.00 Gm. | 2.00 Gm. | 2.00 Gm. | 2.00 Gm. |
| Sodium Benzoate | 0.40 Gm. | 0.40 Gm. | 0.40 Gm. | 0.40 Gm. | 0.40 Gm. |
| Sodium Citrate | 0.16 Gm. | 0.16 Gm. | 0.16 Gm. | 0.16 Gm. | 0.16 Gm. |
| Propylparaben | 0.01 Gm. | 0.01 Gm. | 0.01 Gm. | 0.01 Gm. | 0.01 Gm. |

Continued

| Ingredient | Control | A | B | C | D |
|---|---|---|---|---|---|
| Methylparaben | 0.09 Gm. | 0.09 Gm. | 0.09 Gm. | 0.09 Gm. | 0.09 Gm. |
| Sodium Chloride | — | 4.00 Gm. | 12.00 Gm. | 16.00 Gm. | 20.00 Gm. |
| NaCl Concentration | (0% w/v) | (5% w/v) | (15% w/v) | (20% w/v) | (25% w/v) |

More sodium citrate or citric acid was added to adjust the pH to the desired value. The results are shown below in Table III.

TABLE III

Effect of Sodium Chloride

| Sample | pH | Storage Temp. °C. | Initial Physical | Initial Microscopic | After 3 Days Physical | After 3 Days Microscopic | After 7 Days Physical | After 7 Days Microscopic | After 14 Days Physical | After 14 Days Microscopic |
|---|---|---|---|---|---|---|---|---|---|---|
| Control | 6.5 | — | H.S. | N.N. | Growth | N.L.G. | N.T. | N.T. | N.T. | N.T. |
| A | 6.5 | 25 | H.S. | N.N. | N.C. | N.C. | N.C. | N.T. | N.C. | N.C. |
| A | 6.5 | 5 | H.S. | N.N. | Growth | N.L.G. | N.T. | N.T. | N.T. | N.T. |
| B | 6.5 | 5 | H.S. | N.N. | Growth | N.L.G. | N.T. | N.T. | N.T. | N.T. |
| C | 6.5 | 5 | H.S. | N.N. | N.C. | Some needles | N.C. | Some needles | N.C. | Some needles |
| D | 6.5 | 5 | H.S. | N.N. | N.C | N.C. | N.C. | N.C. | N.C. | N.C. |
| Control | 5.0 | 25 | H.S. | N.N. | G.A.N. | G.A.N. | N.T. | N.T. | N.T. | N.T. |
| A | 5.0 | 25 | H.S. | N.N. | N.C. | N.C. | N.C. | N.C. | N.C. | N.C. |
| A | 5.0 | 5 | H.S. | N.N. | Growth | N.L.G. | N.T. | N.T. | N.T. | N.T. |
| B | 5.0 | 5 | H.S. | N.N. | N.C. | Some needles | N.C. | Some needles | N.C. | Some needles |
| C | 5.0 | 5 | H.S. | N.N. | N.C. | N.C. | N.C. | N.C. | N.C. | N.C. |

The results recorded in Table III show that the pH has no influence on the effect of sodium chloride in preventing the hydration of ampicillin. About 5 percent *w/v* sodium chloride is required to prevent hydrate formation for at least two weeks at room temperature while about 25 percent *w/v* is required at refrigerated temperatures.

EXAMPLE 4

The following example illustrates the effects of pH on the stabilization of an anhydrous ampicillin aqueous suspension.

A dry power is prepared from the following recipe:

| | |
|---|---|
| Anhydrous Ampicillin | 2.00 Gm. |
| Sodium Biphosphate | 0.05 Gm. |
| Methylparaben | 0.09 Gm. |
| Propylparaben | 0.01 Gm. |
| Sodium Cyclamate | 0.27 Gm. |
| Sucrose | 22.00 Gm. |
| Sucrose Concentration | (27.5% w/v) |

The dry powder was reconstituted by mixing with water to make 80 milliliters of a suspension (125 milligrams/5 milliliters) and was adjusted to a pH of 4.0 by means of citric acid.

Following the same procedures samples were prepared having a pH of 3.0, 3.7, 4.0, 4.5, 5.0, 5.2, 6.0, respectively, by using citric acid or sodium hydroxide to adjust the pH.

The samples were divided into two groups. One group was stored at room temperature (25° ± 2°C). The second group was stored in a refrigerator at a temperature of 5° ± 2°C.

After 7 days the samples were analyzed by Differential Thermal Analysis while physical and microscopic observations were recorded for up to 14 days. The results are shown below in Table IV.

Table IV shows that good agreement exists between microscopic observations and DTA results. The following conclusions may be drawn from Table IV.

The pH 4.0 sample does not show any crystal growth, physically or microscopically for at least 2 weeks. Some sample stored for over 1 month did not show any

TABLE IV

Effect of pH in Presence of 27.5% w/v Sucroses

| pH of Sample | Storage Temp. °C. | Initial Physical | Initial Microscopic | After 7 Days Physical | After 7 Days Microscopic | DTA | After 14 Days Physical | After 14 Days Microscopic |
|---|---|---|---|---|---|---|---|---|
| 6.0 | 25 | H.S | N.N. | Growth | N.L.G. | >10% | Growth | N.L.G. |
| 5.5 | 25 | H.S | N.N. | Growth | N.L.G. | >10% | Growth | N.L.G. |
| 5.35 | 25 | H.S. | N.N. | Growth | N.L.G. | 10–20% | Growth | N.L.G. |
| 5.2 or 5.0 | 25 | H.S. | N.N. | N.C. | Very few needles | None Detected (<10%) | N.C. | Very few needles |
| 4.0 or 4.5 | 25 | H.S. | N.N. | N.C. | N.C. | None Detected (<10%) | N.C. | N.C. |
| 6.0, 5.5 or 5.0 | 5 | H.S. | N.N. | Growth | N.L.G. | N.T. | Growth | N.L.G. |
| 4.5 | 5 | H.S. | N.N. | Growth | N.L.G. | >20% | Growth | N.L.G. |
| 4.0 | 5 | H.S. | N.N. | N.C. | N.C. | None Detected (< 10%) | N.C. | N.C. |
| 3.7 | 5 | H.S. | N.N. | N.C. | N.C. | None Detected (<10%) | N.C. | N.C. |
| 3.0 | 5 | H.S. | N.N. | N.C. | N.C. | N.T. | N.C. | N.C. |

growth. No hydrate is detected by Differential Thermal Analysis after storage of the suspension at room temperature and refrigerated conditions for two weeks. Similar results are obtained at pH values below pH 4.3.

Formulations having a pH of 4.5 or higher show crystal growth at refrigerated temperatures both physically and microscopically, and the differential analysis shows the presence of excessive amounts of the hydrated drug. At room temperature, crystal changes and hydrate formation occur at pHs above 5.2.

Based on the foregoing, a pH of 5.2 or lower is required for storage of aqueous suspensions of anhydrous ampicillin at room temperature. A pH lower than 4.5 is required to prevent crystal growth and hydrate formation of drugs stored at refrigerated temperatures (2°–15°C). At the lowest pH 3.0 no crystal change was apparent, however, crystal changes were apparent at pH 4.5. No crystal changes were noted at pH 4.2.

Based on the foregoing experiments, a pH range of 5.2 to 3.0 are the limits for ampicillin solutions depending on storage temperatures.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

For instance as will appear from the foregoing, various modifications of the foregoing, employing the invention are possible within the scope thereof as defined by the appended claims so long as the advantages of the invention with respect to conversion to hydrated forms and physical stability are attained. In addition it should be noted that the variations given above and in the claims are those tested in laboratories.

What is claimed is:

1. A stabilized aqueous pharmaceutical suspension comprising:

a. 1.25 to 10 percent by weight per volume of an anhydrous ampicillin;

b. About 70 to 86 percent *w/v* of sucrose; and c. A buffer adjusting pH to a range between about 5 to 6.5

2. A dry pharmaceutical powder reconstitutable with water to 80 milliliters having the following composition:

| | |
|---|---|
| Anhydrous ampicillin | 2.00 gm. |
| Sodium benzoate | 0.40 gm. |
| Sodium citrate | 0.16 gm. |
| Propylparaben | 0.01 gm. |
| Methylparaben | 0.09 gm. |
| Sucrose | 64.00 gm. |

* * * * *